(No Model.)

F. & T. F. MENDENHALL.
VEHICLE WHEEL.

No. 528,376.  Patented Oct. 30, 1894.

WITNESSES:
F. McArdle.
Co. Sedgwick.

INVENTORS
F. Mendenhall
T. F. Mendenhall
BY Munn & Co.
ATTORNEYS.

UNITED STATES PATENT OFFICE.

FRANK MENDENHALL AND THOMAS F. MENDENHALL, OF MOOREPARK, MICHIGAN.

VEHICLE-WHEEL.

SPECIFICATION forming part of Letters Patent No. 528,376, dated October 30, 1894.

Application filed January 17, 1894. Serial No. 497,129. (No model.)

*To all whom it may concern:*

Be it known that we, FRANK MENDENHALL and THOMAS F. MENDENHALL, of Moorepark, in the county of St. Joseph and State of Michigan, have invented a new and Improved Vehicle-Wheel, of which the following is a full, clear, and exact description.

Our invention relates to improvements in vehicle wheels; and the object of our invention is to produce a wheel having the usual spokes and fellies, but having also certain simple and conveniently operated devices by which the length of the spokes may be regulated and the felly sections spread, to the end that the tire may be easily tightened and all rattling and looseness obviated.

A further object of our invention is to construct and arrange the adjusting mechanism in such a manner that it is very durable, cannot become clogged with dirt and dust, and adds to the strength of the wheel.

To these ends our invention consists of certain features of construction and combinations of parts, which will be hereinafter described and claimed.

Reference is to be had to the accompanying drawings, forming a part of this specification, in which similar figures of reference indicate corresponding parts in all the views.

Figure 1:
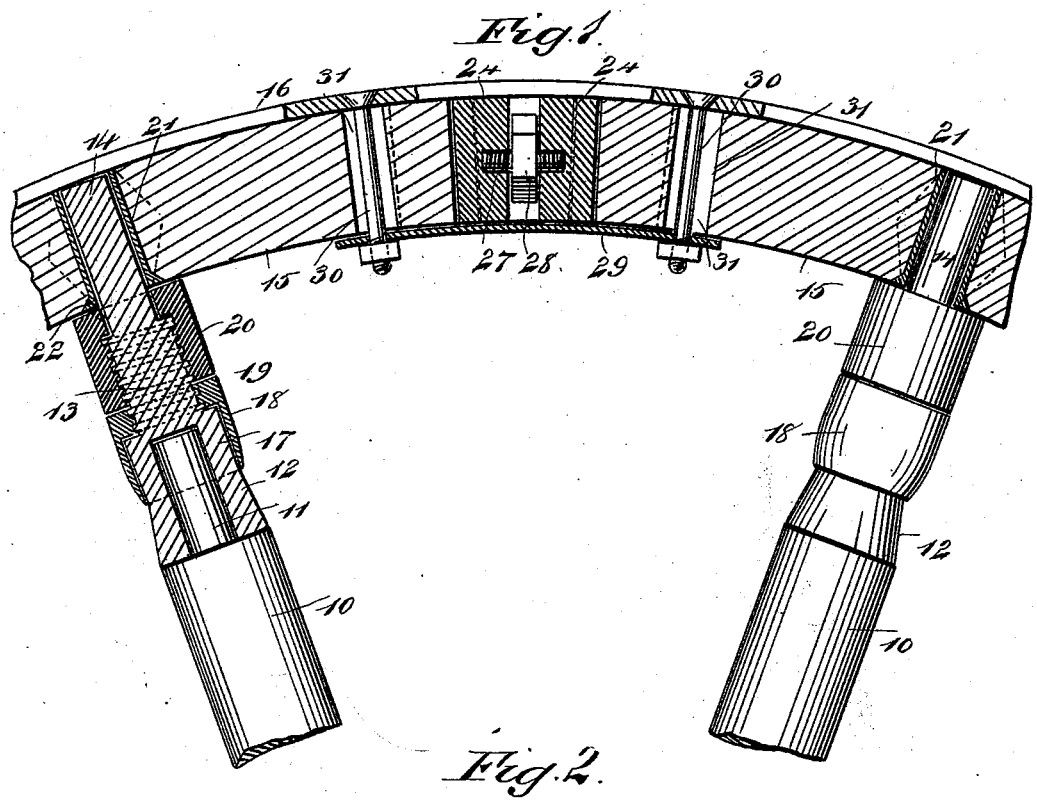
Figure 2:
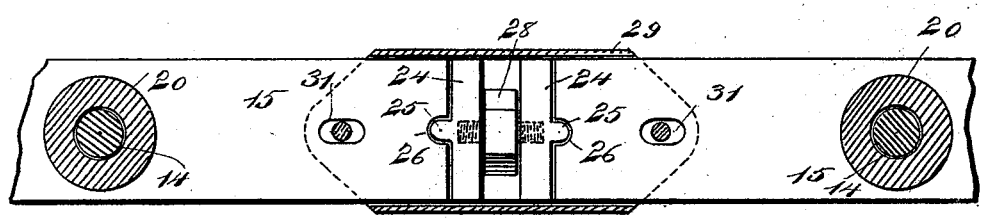
Figure 3:
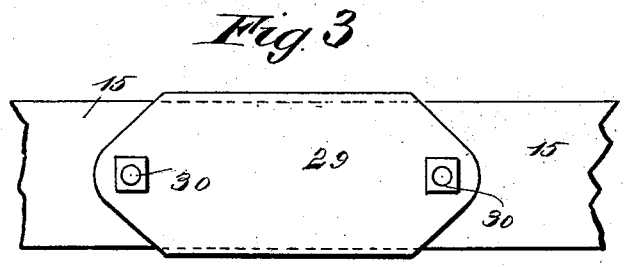

Figure 1 is a broken detail sectional view of the wheel embodying our invention, showing particularly the mechanism for adjusting the spokes and spreading the felly sections. Fig. 2 is a detail sectional plan of a portion of the wheel and of the spreading device; and Fig. 3 is a broken plan view, showing the clip for covering the spreading device.

The wheel is provided with the usual spokes 10, each terminating at their outer ends in tenons 11 of the usual kind, but these tenons, instead of entering the felly of the wheel in the usual way, enter sockets 12 formed on the inner ends of adjusting screws 13, which screws have smooth outer ends or shanks 14 which project through the sections 15 of the felly and nearly to the tire 16. The felly sections and tire are of exactly the usual kind. The outer end of the socket 12 is cylindrical, as shown at 17, so that it fits snugly in the sleeve 18 which is threaded to fit the screw 13 and forms a portion of the tension device 19, the other part being formed by the nut 20 which turns on the screw 13 next the felly. It will be seen that by turning the nut 20, the nut may be turned against the felly, thus forcing it outward and spreading the wheel so as to take up lost motion, and then by turning the sleeve against the nut the sleeve acts as a check nut and prevents the parts from working loose.

Extending through the felly, opposite each spoke, is a bushing 21, which is thickened at its inner end, as shown at 22, this part being countersunk in the felly, and the bushing extends into contact with the tire while its inner end is pressed by the nut 20, so that any strain on the spokes is applied directly to the tire without seriously affecting the felly, but with a tendency to keep the tire tight.

It will be seen that by turning the tension device, that is, the parts 18 and 20, the spokes may be adjusted, as the screw and the tension device really form a part of each spoke. As the spokes become loose, the tension device may be turned out, thus taking up all lost motion and keeping the wheel absolutely tight. It will be observed that by providing the sleeve 18 dirt and dust are excluded from the screw 13 which cannot therefore become clogged and inoperative.

It is obvious that the lengthening of the spokes has a tendency to separate the felly sections, and to compensate for this the following mechanism is employed: Between the ends of the two felly sections are blocks 24, the size of which corresponds with the ends of the felly sections, and these blocks are provided with radially extending ribs 25, see Fig. 2, which enter grooves 26 in the felly sections, this arrangement preventing the blocks from moving laterally. The blocks are connected by a screw 27, one end of which is provided with a right thread and the other with a left thread, these ends fitting in corresponding threaded portions of the two blocks, and the screw is provided with a fixed nut 28 which is preferably octagonal, although it may be of any suitable shape, and by turning the nut the blocks may be adjusted so that they may press on the ends of the felly sections and take up all lost motion.

The spreading device is covered by a clip 29, which incloses three sides of the felly, the other side being covered by the tire 16. The clip is held in place by bolts 30 which project through the tire and felly, and the holes 31 in the felly are wide enough to permit any necessary lengthwise movement of the felly sections. The nut 28 may be of such a size that one of its flat sides may come flush with one edge of the blocks 24, and consequently after the nut is adjusted and the clip 29 fastened in place, the clip, bearing against one of the flat sides of the nut, efficiently prevents the nut from turning and the blocks from loosening.

Having thus described our invention, we claim as new and desire to secure by Letters Patent—

1. The combination, with the wheel spoke, the felly and the tire, of a screw projecting through the felly and engaging the outer end of the spoke, a tension device threaded on the screw between its head and the felly, and a bushing held in the felly and surrounding the screw therein, the outer end of the bushing engaging the tire, while its inner end is adapted for engagement with the tension device, so that the strain on the spokes is directly transmitted to the tire through the medium of the said bushing, substantially as described.

2. The combination, with the adjacent felly sections, having radial grooves in their opposing faces of spreader blocks loosely arranged between the two sections, and provided with radially disposed ribs engaging the said grooves and a right and left screw connecting the blocks, substantially as described.

FRANK MENDENHALL.
THOMAS F. MENDENHALL.

Witnesses:
D. J. BURGMAN,
B. F. CRESSLER.